United States Patent [19]

Heimovics, Jr.

[11] Patent Number: 4,513,881

[45] Date of Patent: Apr. 30, 1985

[54] TEMPERATURE COMPENSATOR FOR PRESSURE REGULATOR

[75] Inventor: John F. Heimovics, Jr., Akron, Ohio

[73] Assignee: The B. F. Goodrich Company, Akron, Ohio

[21] Appl. No.: 456,230

[22] Filed: Jan. 7, 1983

[51] Int. Cl.³ .............................................. B67D 5/08
[52] U.S. Cl. .................................. 222/54; 236/99 R; 137/468
[58] Field of Search ...................... 222/52, 54, 3, 399, 222/394; 137/468; 236/99 R, 92 A, 99 J, 99 F; 280/728; 169/26, 19

[56] References Cited

U.S. PATENT DOCUMENTS

| 853,541 | 5/1907 | Eddy | 236/99 R |
|---|---|---|---|
| 2,310,576 | 2/1943 | Dodge | 222/54 |
| 2,502,452 | 4/1950 | Grant, Jr. et al. | 222/3 |
| 2,909,324 | 10/1959 | Weber et al. | 236/99 R |
| 3,006,507 | 10/1961 | Bauerlein | 222/54 |
| 3,214,061 | 10/1965 | Mills | 222/54 |
| 3,593,917 | 7/1971 | Buisson | 236/99 R |
| 3,750,639 | 8/1973 | DiGirolamo | 236/99 J |

FOREIGN PATENT DOCUMENTS 798369  8/1958  United Kingdom .................. 222/3

Primary Examiner—Joseph J. Rolla
Assistant Examiner—Kenneth Noland
Attorney, Agent, or Firm—Philip P. McCann; Joseph Januszkiewicz

[57] ABSTRACT

A temperature compensator mounted on a gas pressure regulator having a spring loaded valve in which the amount of compression in the spring is changed by moving an adjusting member of the compensator in response to changes in temperature. The temperature compensator may include a piston and cylinder assembly containing a fluid which contracts in response to a reduction in temperature and expands in response to an increase in temperature. The piston is in engagement with the spring and is moved to change the amount of compression in the spring in response to the change in temperature.

5 Claims, 4 Drawing Figures

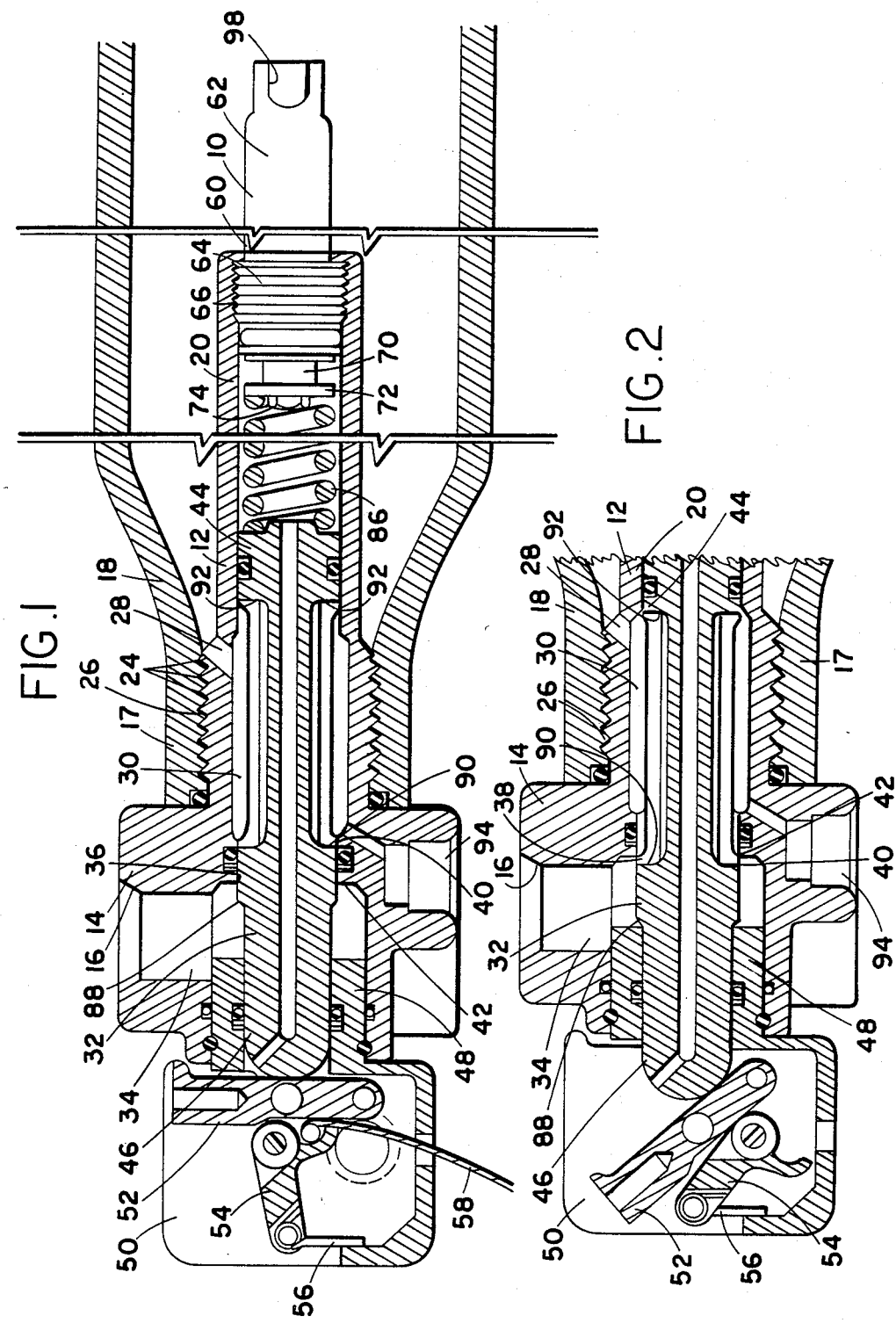

TEMPERATURE COMPENSATOR FOR PRESSURE REGULATOR

BACKGROUND OF THE INVENTION

This invention relates to fluid pressure regulators for use in inflation systems for inflatable escape slides and other inflatables where the output pressure of the gas flow is increased as the pressure of the high pressure gas supply decreases during the inflation process. This increase in pressure is especially advantageous in systems where the gas under pressure is supplied to an aspirator and counteracts the increase in backpressure due to the inflation of the slide or other inflatables. If the regulator is set for optimum operation at room temperature, it does not operate efficiently at low temperatures in the range of −40° F. (−40° C.). Therefore it has been the practice to set the regulator for a compromise temperature which reduces the efficiency of the system at lower temperatures. The reduction in efficiency has resulted in an excessively high output pressure of the gas flow using up an excessive amount of gas and requiring a larger bottle of gas. Also the time required to deploy the inflatable has been excessive at moderate temperatures.

SUMMARY OF THE INVENTION

The temperature compensator of the invention is mounted on a fluid pressure regulator and is responsive to changes in temperature of the gas in the high pressure fluid container so that the regulator can be set for optimum operation at moderate temperatures and at the same time provide satisfactory regulation at substantially lower temperatures. In this way the regulator with the temperature compensator has appreciably decreased the deployment time and provided the required gas flow with a reduced size high pressure container.

In accordance with one aspect of the invention there is provided a temperature compensator for a gas pressure regulator having a valve member movable to open a pressurized gas discharge orifice comprising temperature sensitive adjusting means for adjusting the amount of valve member opening movement in response to increases and reductions in temperature providing smaller orifice openings at lower temperatures and larger orifice openings at higher temperatures to maintain an optimum flow of gas to an aspirator for filling inflatables with a gas and air mixture under pressure.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 1 is an axial cross section of a fluid pressure regulator in the closed condition mounted on a high pressure gas bottle showing the temperature compensator of this invention mounted on the regulator with parts being broken away.

FIG. 2 is a fragmentary sectional view of the regulator like FIG. 1 showing the regulator in the open condition.

DETAILED DESCRIPTION

Figure 3:
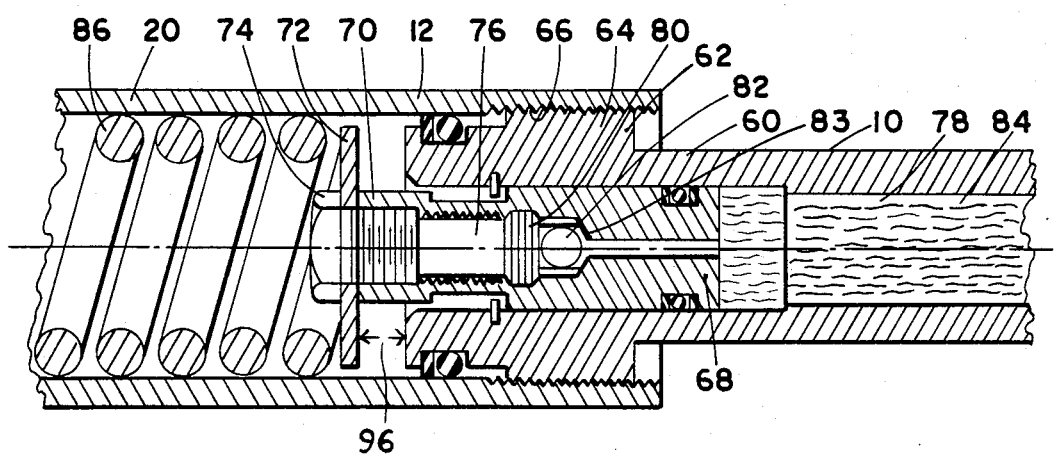
FIG. 3 is an enlarged fragmentary sectional view of a portion of the regulator and a portion of the temperature compensator which is mounted on the regulator.

Referring to FIGS. 1 and 3, a temperature compensator 10 is shown mounted on a gas pressure regulator 12 which has a manifold 14 with a hose port 16 in communication with an aspirator (not shown) for inflating an escape slide or other inflatable (not shown). The gas pressure regulator 12 is mounted in neck 17 of a high pressure gas bottle 18 and regulates the flow of high pressure gas from the bottle through the hose port 16 to the aspirator and escape slide. This regulation is desirable to increase the output pressure of the gas flow as the pressure of the gas in the bottle 18 decreases during the inflation process.

The regulator 12 is shown in the closed condition in FIG. 1 and in the open condition in FIG. 2. The regulator 12 has a supporting member such as tubular body 20 extending outwardly from the manifold 14 through the neck 17 of the bottle 18. The tubular body 20 may have threads 24 at the outer periphery for threaded engagment with a threaded portion 26 in the neck 17 of the bottle 18. A port 28 in the tubular body 20 provides communication from the space within the bottle 18 to a high pressure chamber 30 within the tubular body. A valve member 32 is slidably mounted in the tubular body 20 and extends into a low pressure chamber 34 in the manifold 14.

The valve member 32 is slidably mounted in a cylindrical opening 36 in the manifold 14 for closing the opening, as shown in FIG. 1, and providing an orifice 38 between an edge 40 of the valve member and an edge 42 of the opening in the manifold. This orifice 38 provides communication between the high pressure chamber 30 and low pressure chamber 34 which is in communication with the hose port 16. The valve member 32 also has a boss 44 at one end in slidable engagement with the inner surface of the tubular body 20 and spaced from the edge 40 to form the high pressure chamber 30.

At the other end, the valve member 32 has an actuating plunger 46 which is slidably mounted in a sleeve 48 of an actuating assembly 50 mounted on the manifold 14. The actuating assembly 50 may have a lever 52 pivotally mounted for swinging movement toward and away from the actuating plunger 46. A latch 54 is also pivotally mounted in the actuating assembly 50 for engagement with the lever 52 and is held in position by a spring 56 as shown in FIG. 1. A lanyard 58 is connected to the latch 54 for pulling the latch downward to release the lever 52 and permit movement of the valve member 32 to the left as shown in FIG. 2.

As shown more clearly in FIG. 3, the temperature compensator 10 includes a piston and cylinder assembly 60 with a cylinder 62 having a threaded portion 64 in threaded engagement with threads 66 in the inner surface of the tubular body 20 for adjustably moving the piston and cylinder assembly toward and away from the valve member 32. A piston 68 is slidably mounted in one end of the cylinder 62 with a piston rod 70 extending out of the cylinder toward the valve member 32. A piston cap or washer 72 is fastened to the piston rod 70 by a screw 74 threaded in a passage 76 in the piston rod.

The passage 76 extends through the piston 68 and piston rod 70 to a cylinder chamber 78.

In the passage 76 may be positioned compensator fluid valve means such as a socket head set screw 80 and a ball 82 for seating in a tapered flanged portion 83 of the passage. When the passage 76 is open, the cylinder chamber 78 may be filled with a suitable fluid 84 such as silicone which expands when heated and contracts when cooled to move the piston 68 toward or away from the valve member 32 in response to changes in temperature.

A resilient means such as a coil spring 86 is positioned between the boss 44 of the valve member 32 and the washer 72 on the piston 68. In the position shown in FIG. 1, the coil spring 86 is in compression so that when the actuating assembly 50 is triggered by pulling the lanyard 58 causing the latch 54 to swing downwardly, the valve member 32 will be urged to the left as shown in FIG. 2. The lever 52 may then swing away from the valve member 32 and permit movement of the valve member to the position shown in FIG. 2 opening the orifice 38. This permits passage of the gas from the bottle 18 through the port 28 into the high pressure chamber 30 and then through the orifice into the low pressure chamber 34.

In the low pressure chamber 34, the valve member 32 has a radially extending suface or first effective end area 88 positioned to provide a force for urging the valve member in a direction to close the orifice 38. In the high pressure chamber 30, the valve member 32 has a radially extending surface at either end providing a second effective end area 90 and a third effective end area 92 positioned to provide forces in opposite directions operating on the valve member. The size of the effective end areas 88, 90 and 92 are selected so that the forces produced by the gas pressure in the low pressure chamber 34 and high pressure chamber 30 will balance the force of the spring 86 and provide a desired size of the orifice 38.

Figure 4:
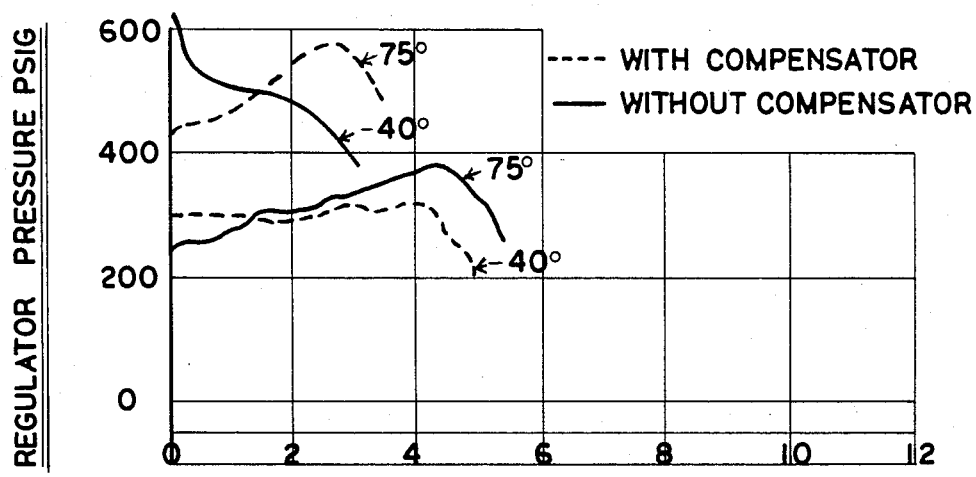
FIG. 4 is a pressure versus time graph showing the operation of a regulator with and without the temperature compensator of this invention at selected temperatures.

Referring to FIG. 4, the regulator pressure and the deployment time is shown in solid lines for a regulator 12 without a compensator 10 at a moderate temperature of 75° F. (24° C.) and at a colder temperature of −40° F. (−40° C.). With the temperature compensator 10 of this invention, the regulated pressure is shown in dotted lines at the same temperatures. This difference in regulated pressure at the −40° F. (−40° C.) temperature is obtained by movement of the piston 68 to the right, as shown in FIG. 3, as the fluid 84 contracts and the washer 72 moves to the right reducing the force exerted on the valve member 32 by the spring 86. This adjustment limits the movement of the valve member 32 to the left, as shown in FIG. 2, reducing the size of the orifice 38 so that the gas pressure in the low pressure chamber 34 at the beginning of the inflation procedure is decreased. At the reduced regulator pressure, the aspirator operates with greater efficiency as it fills the inflatable escape slide with a mixture of air and gas.

As the gas pressure in the bottle 18 decreases, the valve member 32 will be moved to the left increasing the pressure in the low pressure chamber 34 and counteracting the backpressure in the escape slide. This provides a greater efficiency in the use of the pressurized gas contained in the bottle 18 which may be carbon dioxide or nitrogen or a mixture of the two. The gas pressure may be around 3,000 pounds per square inch (211 kilograms per square centimeter) and a suitable mixture may be from 30% carbon dioxide and 70% nitrogen to 85% carbon dioxide and 15% nitrogen. The bottle 18 may be recharged by injecting a suitable mixture of gas through a charge fitting port 94 in the manifold 14 which is suitable for receiving a special charge fitting (not shown).

As shown more clearly in FIGS. 1 and 3, the position of the piston 68 relative to the cylinder 62 may be set by removing the piston and cylinder assembly 60 from the tubular body 20, removing the screw 74 and releasing the ball 82 by turning the socket head set screw 80 in the passage 76. Then fluid 84 may be poured into the cylinder chamber 78 to a predetermined position with a gap 96 of a predetermined size between the washer 72 and the end of the cylinder 62. When this is done at a particular predetermined temperature, the gap 96 can be set to provide the temperature compensation which is required. After setting the gap 96 the set screw 80 may be turned to push the ball 82 into sealing engagement with the flanged portion 83 in the passage 76. The screw 74 may then be fastened in the passage 76 to retain the washer 72 on the end of the piston rod 70.

To provide the desired initial compression of the spring 86, the cylinder 62 may be screwed into the tubular body 20 a desired distance. The cylinder 62 is provided with a substantially square end 98 so that a wrench may be applied to turn the cylinder and adjust the position relative to the tubular body 20.

As shown in the drawings, the fluid 84 in the cylinder 62 is prevented from leaking around the piston 68 by suitable seals. Also suitable seals are provided in the regulator for retaining the gas under pressure and preventing leakage at mating surfaces.

With the temperature compensator 10 described and shown, the washer 72 is moved toward the valve member 32 by expansion of the fluid 84 in the cylinder chamber 78 upon an increase in temperature which will compensate for the higher pressure of the gas in the bottle 18. Conversely when the temperature of the gas in the bottle 18 decreases, the fluid 84 in the cylinder chamber 78 of the temperature compensator 10 will contract permitting the washer 72 on the piston rod 70 to move away from the valve member 32 and reduce the compression force of the spring 86. This will decrease the regulator pressure in the low pressure chamber 34 at the beginning of the inflation procedure.

An alternative temperature compensator may be provided through mounting the washer 72 on an adjusting screw threaded in the end of the tubular body 20 of the regulator 12 and turned by suitable temperature responsive means such as a bimetallic powered rotating actuator (not shown).

While a certain representative embodiment and details has been shown for the purpose of illustrating the invention, it will be apparent to those skilled in the art that various changes and modifications other than those referred to may be made therein without departing from the spirit or scope of the invention.

I claim:

1. A temperature compensator for a gas pressure regulator having:
    (a) a valve member movable to open a pressurized gas discharge orifice, said valve member having at least a first effective end area exposed to gas under pressure in said regulator and positioned to provide a force for urging said valve member in a direction to close said orifice and a second effective end area exposed to gas under pressure and positioned to provide a force for urging said valve member in a direction to open said orifice; and (b) a resilient means providing a force for urging said valve member in a direction to open said orifice; wherein said temperature compensator includes a temperature sensitive adjusting means for adjusting the amount of valve member movement in response to increases in temperature providing smaller orifice openings at lower temperatures and larger orifices at higher temperatures to maintain an optimum flow of gas to an aspirator for filling inflatables with a gas and air mixture under pressure where the temperature sensitive adjusting means comprises a piston and cylinder assembly mounted on said regulator and connected to said valve member, a fluid in the cylinder of said assembly, said fluid being expandable and contractable in response to an increase or reduction of temperature whereby the piston of said assembly is moved to different temperature compensating positions for adjusting the amount of valve member movement and said piston being engageable with said resilient means to vary the amount of force provided by said resilient means in response to said increases and reductions in temperature.

2. A temperature compensator in accordance with claim 1 wherein said valve member has a third effective end area exposed to gas under pressure and positioned to provide a force for urging said valve member in a direction to close said orifice.

3. A temperature compensator in accordance with claim 2 wherein said regulator has a low pressure chamber and a high pressure chamber connected by said gas discharge orifice, said first effective end area being exposed to gas in said low pressure chamber and said second and third effective end areas being exposed to gas pressure in said high pressure chamber for adjusting the size of said discharge orifice as the pressures in said high pressure and low pressure chambers change.

4. A temperature compensator in accordance with claim 3 wherein said effective end areas are of a size to reduce said discharge orifice opening when the difference in pressure is reduced to maintain a regulator pressure of gas flowing to said aspirator which is reduced when the orifice is initially opened and increased at intervals of time after opening and said temperature adjusting means decreasing the amount of valve member movement in response to decreases in temperature to compensate for the reduction in temperature of said gas in said high pressure chamber.

5. A temperature compensator for a gas pressure regulator having a valve member movable to open a pressurized gas discharge orifice, said temperature compensator comprising a temperature sensitive adjusting means for adjusting the amount of valve member movement in response to increases and reductions in temperature providing smaller orifice openings at lower temperatures and larger orifice openings at higher temperatures to maintain an optimum flow of gas to an aspirator for filling inflatables with a gas and air mixture under pressure wherein said temperature sensitive adjusting means comprises:

(A) a piston and cylinder assembly mounted on said regulator and connected to said valve member where said assembly includes:
  (1) a piston;
  (2) a cylinder which is in threaded engagement with a regulator supporting member for positioning said cylinder in a predetermined location relative to said regulator and said cylinder has a chamber;
  (3) a passage in said piston and cylinder assembly; and
  (4) compensating fluid valve means for opening and closing said passage; and (B) a fluid in said chamber where said fluid can be added or removed from said chamber through said passage to position said piston in a predetermined location relative to said cylinder and said fluid being expandable and contractable in response to an increase or reduction of temperature whereby said piston of said assembly is moved to different temperature compensating positions for adjusting the amount of valve member movement.

* * * * *